United States Patent [19]
Mohaupt

[11] Patent Number: 5,597,984
[45] Date of Patent: Jan. 28, 1997

[54] CAPACITANCE WEIGHING MAT WITH SUBSTANTIALLY RIGID SEPARATORS

[75] Inventor: Udo H. Mohaupt, Cambridge, Canada

[73] Assignee: Sowal Technologies International Inc., Oakville, Canada

[21] Appl. No.: 403,899
[22] PCT Filed: Sep. 23, 1993
[86] PCT No.: PCT/CA93/00395
§ 371 Date: Mar. 21, 1995
§ 102(e) Date: Mar. 21, 1995
[87] PCT Pub. No.: WO94/18529
PCT Pub. Date: Aug. 18, 1994

[30] Foreign Application Priority Data

Feb. 8, 1993 [CA] Canada ................ 2088936

[51] Int. Cl.⁶ .............. G01G 3/14; G01G 7/06; G01G 19/02
[52] U.S. Cl. .............. 177/210 C; 73/862.626; 361/283.4; 361/291
[58] Field of Search ............. 177/210 C, 136; 73/862.626; 361/283.1, 283.2, 283.3, 283.4, 291

[56] References Cited

U.S. PATENT DOCUMENTS

| | | | |
|---|---|---|---|
| 3,565,195 | 2/1971 | Miller et al. | 177/210 C |
| 3,678,378 | 7/1972 | Trott et al. | 177/210 C |
| 3,875,481 | 4/1975 | Miller et al. | 177/210 C |
| 4,266,263 | 5/1981 | Haberl et al. | 177/210 C |
| 4,793,429 | 12/1988 | Bratton et al. | 177/210 C |

FOREIGN PATENT DOCUMENTS

| | | |
|---|---|---|
| 2175359 | 10/1973 | France . |
| 1916496 | 11/1969 | Germany . |
| 2016428 | 10/1970 | Germany . |

OTHER PUBLICATIONS

RESEARCH DISCLOSURE May 1987, Havant GB pp. 318–319, disclosed anonymously, "The Captive Pad Sensor".

Primary Examiner—Michael L. Gellner
Assistant Examiner—Randy W. Gibson
Attorney, Agent, or Firm—Nixon & Vanderhye P.C.

[57] ABSTRACT

A capacitance mat for use in measuring loads includes a number of substantially horizontal electrode plates (of high strength aluminum) forming a capacitor with a substantially rigid dielectric material (e.g. nylon or fiberglass) separator disposed between the stacked substantially parallel electrode plates. The separators define spaces at which at least one of the electrode plates may bend in response to an applied load, to move with respect to each other, causing the capacitance of the mat to change. The separators may comprise a number of substantially parallel elongated strips of substantially rigid dielectric material spaced from each other in a dimension transverse to the dimension of elongation to define the spaces. At least first, second and third electrode plates may be provided, with the separator strips between the first and second plates substantially parallel to the strips between the second and third plates and located substantially centrally in the spaces between the strips between the second and third plates. The strips may be about 1/32nd of an inch thick and adhesively secured to the plates. Circuitry mounted on the mat detects the changes in capacitance resulting from bending of at least one of the electrode plates.

20 Claims, 2 Drawing Sheets

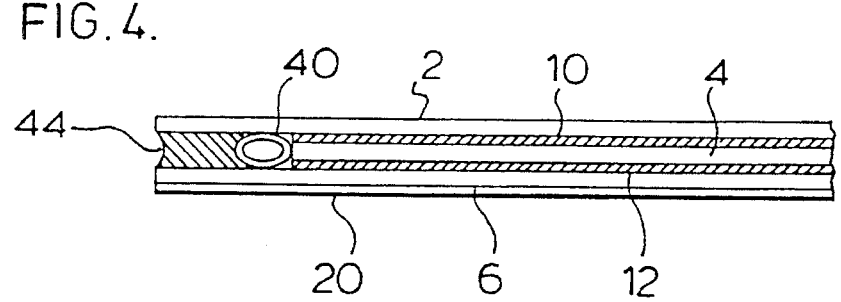
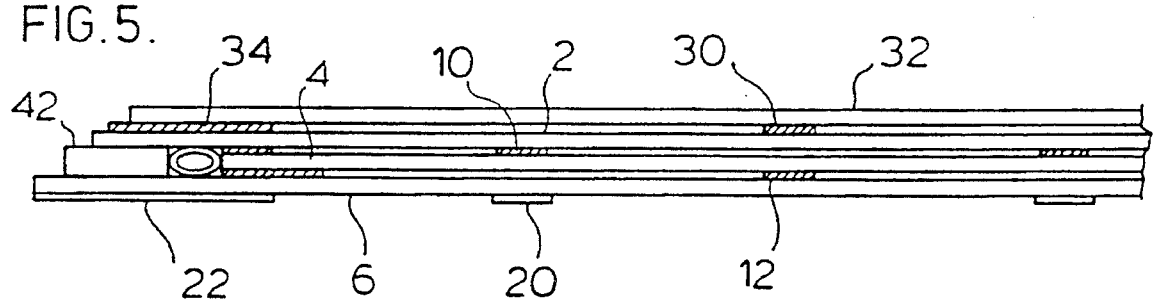
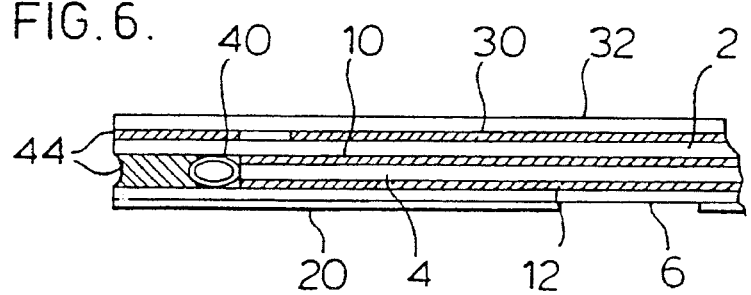

5,597,984

CAPACITANCE WEIGHING MAT WITH SUBSTANTIALLY RIGID SEPARATORS

TECHNICAL FIELD

This invention relates to the field of weigh scales and, in particular, to dynamic or static weigh scales using a capacitance transducer.

BACKGROUND ART

U.S. Pat. No. 3,782,486 discloses a device for sensing and measuring a transient load such as one imposed by at least one wheel on an axle of a passing vehicle. The device comprises a low profile pad or mat comprising three electrode plates separated by a dielectric, elastomeric material. Capacitance is established between the central electrode and each of the outside electrodes. The electrodes are connected to a device for detecting variations in the electrode spacing owing to transient loads. Void areas are located in the body of the mat to provide for mat deformation proportional to the magnitude of the applied load. The patent describes the need for a portable weight sensing device having the characteristics of (a) portability, (b) simplicity, (c) ruggedness and reliability, (d) insensitivity to location of load and (e) cheapness. Disclosure of other capacitance weighing transducers is found in British patent specification 1,453,934 and Canadian patents 1,069,945; 1,013,779 and 901,028. All of these transducers have different types of elastomeric dielectric materials. All measure a load using the change in the capacitance of the transducer caused by compression of the dialectic.

Despite some claims to the contrary, capacitance transducers using elastomeric dielectric materials may not have a linear response and may have significant hysteresis under a variety of conditions and loads. Tests on such mats suggest that the cause is that diametric properties of the combination of expansion gaps (or air holes) and elastomeric material between the electrodes may vary in a non-linear manner under compression, that elasticity of the material may be temperature dependant and that there may be memory effects in elastomeric material when loads are applied in rapid succession.

It is an object of this invention to construct an improved capacitance transducer which does not rely upon compression of elastomeric dielectric materials to change the capacitance. Instead, the present invention employs a novel principle of bending adjacent electrode plates in synchronous opposition over a plurality of substantially rigid dielectric separators to create a plurality of areas of closer proximity between the plates to effect capacitance changes.

DISLCOSURE OF THE INVENTION

In this description and in the claims the words "horizontal" and "vertical" and the like are used to describe the respective orientation of parts of the invention to each other without necessarily requiring that the parts have that orientation in an absolute sense during operation. Nevertheless, it is anticipated that ordinarily the parts will have such orientation in normal use.

The present invention is a transducer for a weigh scale or the like. Each transducer comprises a capacitance mat having a plurality of electrode plates lying over one another. Each of the electrode plates is spaced apart from the others by a dielectric layer comprising a plurality of dielectric separators. The dialectic separators may be dots, squares, strips or other shapes which allow a uniform spacing across the layer to permit the electrode plates to bend over the separators into the spaces between the separators when a load is applied to the mat. The separators are sufficiently thick and are spaced sufficiently close together to allow plate bending without electrode contact under expected loads (although overload stops may be an alternative or additional feature). The surface of the separators is securely attached between adjacent electrode plates to resist shear forces generated dining use of the mat. The separators preferably extend across the plates to permit plate bending at any area of load application. The spacing of the separators, and their dimensions may be optimized empirically or otherwise without further invention by persons skilled in the art for specific load ranges and desired sensitivity.

The separators of each layer of dielectric between the electrode plates are spaced alternately, i.e., separators in an upper layer lie centrally over the spaces between the separators in a lower layer. The alternate spacing permits separators of one layer to act as resistance fulcrums for bending of an electrode plate by load forces transmitted by separators of another layer. In other words, when a load is applied to an area of a mat, the load and the corresponding resistance to the load are transmitted to the plates of the mat by the separators. Each plate then responds to the load and resistance forces by bending over the separators into the spaces between the separators of an adjacent layer in a sinuous, undulating or wavelike form. Alternate and equal spacing of separators of adjacent layers results in adjacent plates bending 180 degrees out of phase, i.e., towards and away from each other. The areas where adjacent electrode plates bend closer together are areas of increased capacitance.

In a preferred embodiment, thin, narrow, parallel strips of a diametric material are used as separators. The strips are spaced apart equally in each layer and run across the electrode plate in parallel. Each dielectric layer has strips running centrally across the spaces between the strips of adjacent layers. Capacitance is established by a first electrode of one charge being positioned between second and third electrodes of opposite charge (or ground). In this embodiment, the first electrode will bend alternatively towards the second and third electrodes to increased capacitance. In this embodiment it is preferred that the outside electrode plates have a ground charge to provide shielding from extraneous noise which might otherwise affect readings.

In some preferred embodiments having a center electrode and two outside ground electrodes, rows of parallel strips may be added to the underside of the bottom plate to facilitate its bending. Similarly, top strips may be added over the top plate. Top and bottom strips added to the outside of the electrodes are not required to be dialectic material since no capacitance is established across them. These strips function primarily as force transmitting members and may be made of any suitable materials, including metal. A load bearing plate may be added to the top (or underside) of the mat, over (or under) such additional strips, to spread a narrowly applied load (or resistance) to a broader area of the mat The top load bearing plate, being separated from the electrodes, insulates the transducer from increases in temperature caused by the hot tires of a vehicle passing over it.

To obtain a measurement of the capacitance of the mat, a resistance/capacitance (R/C) circuit is constructed in which the mat forms the capacitor. An oscillator is connected to this circuit which oscillates at a frequency that depends on the capacitance of the circuit. Thus a load applied to the plates of the transducer causes a variation in space between the electrode plates which alters the capacitance and results in a change in frequency of the oscillator. A measurement of the load can then be obtained by measurement of the change in frequency of the oscillator.

BRIEF DESCRIPTION OF THE DRAWINGS

In the figures which illustrate a preferred embodiment of this invention,

FIG. 4 is a cross-section taken across the length of the mat of FIG. 3 near one end showing the end sealing means.

FIG. 5 is a cross-section taken across the width of a mat having a top load bearing plate and under strips at an approach side showing the sealing and ramp features.

FIG. 6 is a cross-section taken across the length of a mat shown in FIG. 5 showing the end sealing means.

DETAILED DESCRIPTION OF THE DRAWINGS

In the figures, like numerals represent like elements.

Figure 1:
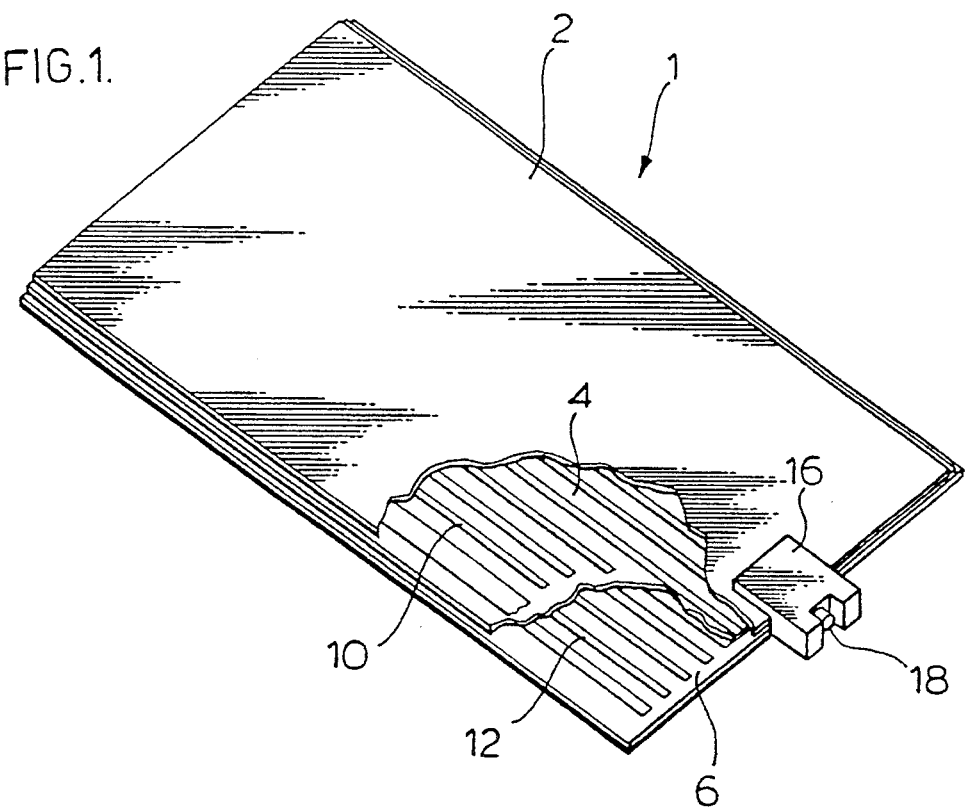
FIG. 1 is a breakaway illustration of a transducer mat of this invention.

The basic elements of this preferred embodiment of this invention are shown in the breakaway view of FIG. 1. A transducer mat (1) of this invention comprises a top electrode plate (2), a central electrode (4) and a bottom electrode plate (6) a layer of separator strips (10) and a layer of separator strips (12). An oscillator and known associated circuitry for taking capacitance readings are contained in box (16). A connection (18) for a cable (not shown) is provided to remove data to computation devices to determine a measurement.

Figure 3:
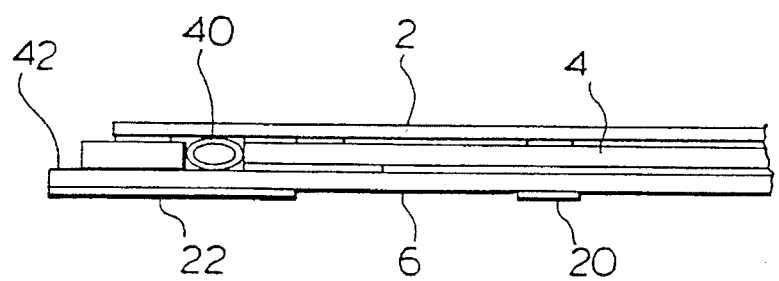
FIG. 3 is a cross-section taken across the width of the mat at an approach side showing the sealing and ramp features.

The top and bottom electrode plates (2) and (6) are grounded to reduce noise. The central electrode plate (4) is charged. Each of the electrode plates (2), (4) and (6) may be constructed of thin, high strength aluminium or other suitable materials which provide conductivity, durability and bending strength. Each electrode plate has approximately the same area so that they substantially overlay one another to construct a three plate capacitor. As shown in FIGS. 3 and 5, however, the dimensions may be slightly different for other purposes explained below. Each plate of this embodiment is about 20" wide, 48" long, about 60 thousandths of an thickness thick and is formed of high strength aluminium 7075-T6.

Figure 2:
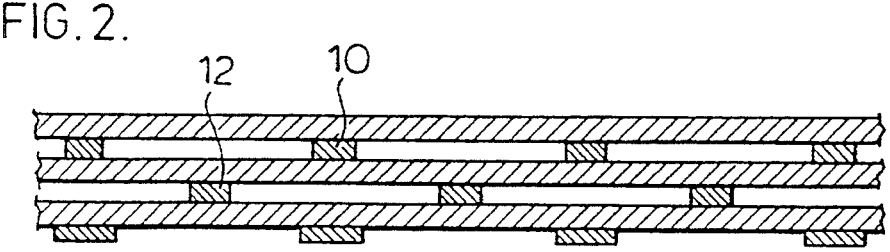
FIG. 2 is a sectional view taken through a mat to illustrate the positioning of the dielectric strips and bottom strips.

As illustrated in FIGS. 1 and 2, the dielectric separator strips (10) and (12) are laid parallel and spaced apart in two layers, strips (10) being between plates (2) and (4) and strips (12) between plates (4) and (6). The strips (10) and (12) may be made of any substantially rigid dielectric material, e.g., nylon. It is preferred, however, to use fibreglass because of its greater insensitivity to temperature changes. The dialectic strips are about ⅟32 of an inch thick and stretch across the length of the mat. They are glued to the electrodes with a suitable adhesive such as an apoxy adhesive.

As shown in FIG. 2, while the strips of both layers are laid in parallel, the strips (10) are alternately spaced to strips (12), i.e., the strips (10) lie over the spaces between the strips (12). This construction permits the electrode plate (4) to bend about each of the strips (10) and (12) in an undulating curve across the width of the mat (1) when a load is applied to the plate (2) and resistance is provided under plate (6). Similarly, the top plate (2) and the bottom plate (6) may bend between the strips (10) and (12) respectively. The result is that the electrode plates bend towards each other in the spaces between the strips. This results in a change in the overall capacitance of the mat which may be detected using the circuitry of box (16) and fed to a computer through the connector (18) for computation into a weight measurement.

As illustrated in FIGS. 2, 3 and 5 base pads (20) may be affixed under plate (6) to run in alternately spaced parallel rows in the spaces between strips (12) to augment the bending of the bottom plate (6). The base pads (20) also permit din and small pebbles to lie between the pads (20) thereby reducing any interference with the operation of the mat (1). As shown in FIG. 5, top pads (30) may be laid in parallel over the spaces between strips (10) to augment bending of plate (2). A load bearing plate (32) may be laid over the top pads (30) to receive the load and distribute it more evenly over the top plate (2). The load beating plate (32) is not part of the capacitor and thus the top pads (30) are not necessarily made of dialectic material. Similarly, the base pads (20) need not be a dialectic material. In the preferred embodiment the load bearing plate (32), the top pads (30) and the bottom pads (20) are made of aluminum. The pads (20) and (30) are bonded to the mat (1).

As shown in FIGS. 3 and 5, plate (6) has a slightly greater width than plate (4). Plate (4) and its extension bar (42) have a slightly greater width than plate (2). Plate (2) is slightly greater than the load bearing plate (32). These small differences in width are used to construct a small incline or ramp to facilitate driving onto the mat (1) and to reduce dynamic loading.

The tolerance for variation in the thickness of the mat (1) is very low, about plus or minus 1,000th of an inch. In one example, that amount of variation resulted in an error of about plus or minus 1½%.

The spaces between the strips (10) and (12) may be filled with air or a dialectic foam of little resistance to compression. Foam may have a higher dielectric value than air and higher sensitivities may be achieved.

The active electrode (4) may be sealed from the ambient conditions as shown in FIGS. 3, 4, 5 and 6. A dielectric material such as an O-ring or plastic tubing (40) is wrapped around the active electrode plate (4) between the ground electrodes (2) and (6) to seal the perimeter of the mat (1). On the side edges, as shown in FIGS. 3 and 5 an aluminum bar is sealed between the plates (2) and (6) to close off the sides. As shown in FIGS. 4 and 6, the gap outside the tubing (40) between the plates (2) and (6) is sealed with a silicon rubber sealant.

INDUSTRIAL APPLICABILITY

The weigh scale of this invention is useful in industry for government monitoring of vehicles passing over a public highway to ensure that weight limitations are being respected. It is also useful to private companies to ensure that vehicles meet such limitations. It is also applicable to situations where someone is attempting to determine the weight being carried by a vehicle for the purposes of tariffs, tolls or other payments. It has similar applicability in both aircraft and railway industries.

What is claimed is:

1. A capacitance mat for use in measuring loads, comprising:

a vertically stacked sandwich of a plurality of substantially horizontal electrode plates forming a capacitor; and substantially rigid dielectric material separator means disposed between stacked electrode plates, said substantially rigid separator means defining spaces at which at least one of said electrode plates may bend in response to an applied load to move with respect to each other, causing the capacitance of the mat to change.

2. A capacitance mat as recited in claim 1 wherein said separator means comprises a plurality of substantially parallel elongated strips, elongated in a dimension of elongation, of substantially rigid dielectric material spaced from each other in a dimension substantially transverse to said dimension of elongation to define said spaces.

3. A capacitance mat as recited in claim 2 wherein said separator substantially rigid dielectric material comprises nylon or fiberglass.

4. A capacitance mat as recited in claim 3 wherein said strips are about 1/32 of an inch thick.

5. A capacitance mat as recited in claim 2 wherein the mat has a length, and wherein said strips extend substantially across the length of the mat.

6. A capacitance mat as recited in claim 2 wherein said strips are adhesively secured to said electrodes.

7. A capacitance mat as recited in claim 1 wherein said electrode plates are formed of high strength aluminum.

8. A capacitance mat as recited in claim 1 wherein said separator substantially rigid dielectric material comprises nylon or fiberglass.

9. A capacitance mat as recited in claim 8 wherein said separator material is about 1/32 of an inch thick and is adhesively secured to said electrode plates.

10. A capacitance mat as recited in claim 1 wherein said plurality of electrode plates comprises at least top, middle, and bottom plates; and wherein said separator means between said top and middle electrode plates define spaces which are offset from spaces defined by said separator means between said middle and bottom electrode plates.

11. A capacitance mat as recited in claim 10 wherein said separator means comprises a plurality of substantially parallel elongated strips, elongated in a dimension of elongation, of substantially rigid dielectric material spaced from each other in a dimension substantially transverse to said dimension of elongation to define said spaces; and wherein said strips of said separator means between said top and middle plates are substantially parallel to said strips between said middle and bottom plates, and located substantially centrally in said spaces between said strips between said middle and bottom plates.

12. A capacitance mat as recited in claim 11 wherein said separator substantially rigid dielectric material comprises nylon or fiberglass strips.

13. A capacitance mat as recited in claim 11 wherein said electrode plates are of non-elastomeric material and consist of said top, middle, and bottom plates.

14. A capacitance mat as recited in claim 1 further comprising circuitry for detecting the change in capacitance resulting from bending of at least one of said electrode plates so that they move with respect to each other.

15. A capacitance mat for use in measuring loads, comprising:

a plurality of substantially parallel electrode plates comprises at least first, second, and third plates; and substantially rigid dielectric material separator means disposed between said substantially parallel electrode plates, said substantially rigid separator means defining spaces at which at least one of said electrode plates may bend, in response to an applied load including a vector substantially transverse to said electrode plates, to move with respect to each other, causing the capacitance of the mat to change; and wherein said separator means between said first and second electrode plates define spaces which are offset from spaces defined by said separator means between said second and third electrode plates.

16. A capacitance mat as recited in claim 15 wherein said separator means comprises a plurality of substantially parallel elongated strips, elongated in a dimension of elongation, of substantially rigid dielectric material spaced from each other in a dimension substantially transverse to said dimension of elongation to define said spaces; and wherein said strips of said separator means between said first and second plates are substantially parallel to said strips between said second and third plates, and located substantially centrally in said spaces between said strips between said second and third plates.

17. A capacitance mat as recited in claim 16 wherein said separator substantially rigid dielectric material comprises nylon or fiberglass strips.

18. A capacitance mat as recited in claim 17 wherein said strips are about 1/32 of an inch thick.

19. A capacitance mat as recited in claim 15 wherein said electrode plates are of non-elastomeric material and consist of said first, second, and third plates.

20. A capacitance mat as recited in claim 15 further comprising circuitry for detecting the change in capacitance resulting from bending of at least one of said electrode plates so that they move with respect to each other.

\* \* \* \* \*